UNITED STATES PATENT OFFICE 2,032,071

CEMENTITIOUS PAINT AND PLASTIC COMPOSITION

Herman A. Scholz, Oak Park, Ill., assignor to United States Gypsum Company, Chicago, Ill., a corporation of Illinois No Drawing. Continuation of application Serial No. 428,490, February 14, 1930. This application September 10, 1934, Serial No. 743,421. In Canada October 30, 1930

10 Claims. (Cl. 134—46)

This invention has reference to a paint composed mainly of cementitious substances in admixture with various substances that modify the consistency and other properties of the cementitious substances and the fillers and pigments added thereto.

This application is a continuation of application Serial No. 428,490, filed February 14, 1930.

In an exterior cold-water paint composition containing a cementitious substance such as Portland cement and the like, it is important that the ingredients of the composition be such that the proper consistency of the paint will be assured, and that the proper setting of the Portland cement or other cementitious composition is obtained.

One of the objects of the present invention is to provide a composition for a cold water paint suitable for exterior uses, wherein the ingredients are so compounded that a proper consistency and setting of the cementitious substance therein is obtained; and also to improve plastic paint compositions and cementitious mixtures in other respects hereinafter specified and claimed.

A further object of the invention is to lower the consistency of suspensions or mixtures of pigments, insoluble mineral matters, cementitious substances and the like in or with gaging fluids or liquids, such as water, etc., by subjecting the suspensions or mixtures to a composition comprising a water-soluble gum and an alkaline reacting substance. Alternatively, the composition may form a part of a dry powdered mixture from which the cement or paint can readily be prepared merely by the addition of a suitable gaging fluid, such as water.

Other objects of the invention will be appreciated from the hereunto appended claims.

In accordance with the present invention, the consistency of various cementitious substances, as may be exemplified by Portland cement and its equivalents, such as calcined gypsum, or suspensions of water-insoluble mineral matter in water and similar fluids,—is markedly lowered by insuring the presence in the suspension, or mixture, of a water-soluble gum, such as gum arabic or talha gum, and an alkaline-reacting substance, such as lime, an alkaline-earth hydroxide or a substance capable of forming the same in contact with water. It appears that there is a reaction between such gum and the alkaline substance, such as the lime, to produce products that influence the fluidity or consistency of the suspensions or mixtures, whereby they will be endowed with greater flowability, so that they may be more readily spread. A further advantage lies in the fact that the suspensions can be made either with less water or other gaging fluid, or with more solids than would otherwise be the case; as a result of which the paint has greater hiding power and a single application will often suffice, whereas otherwise two or more coats would be necessary. In the case of cements, it will be obvious that if the same weight or amount of cement be mixed with less water, while maintaining the consistency as low as that which would be obtained were a larger amount of water or other gaging fluid used, the resulting moulded product will have greater density and greater strength.

In the following formula the various ingredients, particularly the water-soluble gums, react with the alkaline-reacting material, such as the lime, to lower the consistency of the mixture. A workable formula for a paint suitable for application to the exterior of buildings and the like is as follows, although the invention is not to be limited thereby:—

| | Per cent |
|---|---|
| High calcium hydrated lime | 43.0 |
| White Portland cement (waterproofed) | 19.5 |
| Fibrous talc, fine powdered | 12.0 |
| "Metronite", fine powdered | 11.5 |
| Salt (NaCl) | 6.5 |
| Mica, powdered | 5.0 |
| Gum arabic, fine powdered | 1.6 |
| Gum karaya, fine powdered | 0.5 |
| Irish moss, fine powdered | 0.1 |
| Calcium stearate | 0.3 |

The hydrated lime should be white in color and is preferably a high calcium lime but a dolomitic lime may be used. It acts both as a pigment and as a binding agent. It may vary between 35% and 60%.

Waterproofed white Portland cement is preferred but ordinary white Portland cement may be used, and the waterproofing, such as calcium stearate, added separately. Ordinary gray Portland cement or other hydraulic cement may be used in the darker shades where the color does not interfere. It is a binding and hardening agent and also acts as a pigment. It may be varied between 10% and 40%.

The salt (sodium chloride) or other soluble chloride should be a good grade and as free as possible from deliquescent impurities. Since it is a highly ionized electrolyte it prevents the formation of excessive colloidal gels by the lime and Portland cement. It also hastens the set of the paint and improves the hardness and the bond. It may vary between 2% and 8% and may be replaced by potassium chloride.

The gum arabic used in the above formula is the commercial grade, and is used preferably in finely divided form so that it will more quickly dissolve when the paint is mixed with the gaging water. The gum arabic will combine with the lime present by reason of the fact that such gum contains acids and sugars which are capable of forming calcium salts and saccharides by this reaction. The products thus formed from the gum arabic by its interaction with the lime will deflocculate the mineral matter contained in the paint and will prevent the formation of a stiff gel and a premature set in the wet mix. By thus lowering the consistency of the paint it helps the working qualities, particularly the brushing, flowing and leveling. It at the same time lowers the consistency of the Portland cement and the talc and "Metronite," so that the mixture is less viscous and hence has greater flowability. On the other hand, should a stiff mixture be required, less water can be used than would otherwise be the case. As in such a case the resulting mixture will contain more solids per given volume, it logically follows that the mixture will have greater density and will leave a heavier coat of paint than would otherwise be the case; so that a single coat will often suffice where otherwise two coats would be necessary. This is an outstanding advantage and distinguishes the present invention from other waterpaint compositions. The presence of the gum arabic and alkaline substance, such as the lime, also improves the plastic properties of the paint composition. While lime has been specified as the alkaline material it will of course be obvious that other alkaline-reacting materials may be substituted wholly or in part for the lime.

Gum karaya is the finely powdered commercial grade. It has the property of taking up 50 to 75 parts by weight of water and forming a gel-like solution of syrupy consistency. Its function is to modify the flowing and leveling qualities imparted to the paint by the gum arabic and to prevent the paint from flowing excessively under certain conditions, as for example when applied to surfaces lacking somewhat in porosity.

The Irish moss (Chondrus) prevents settling of the mixed paint. It may be replaced by pectin, agar-agar or similar agents producing gels. The amount may be decreased, increased or entirely eliminated.

Calcium stearate is used as a waterproofing agent. It may be replaced by other metallic soaps of other fatty acids, such as magnesium, aluminum, or zinc stearates, palmitates, or oleates or mixtures thereof. Water soluble soaps such as sodium soaps of any of the fatty acids may also be used, as the corresponding calcium soaps will be precipitated by the calcium hydroxide when the paint is mixed with water. The amount may vary between .25% and 3%.

The fibrous talc serves as a filler, a pigment, and as an agent for decreasing the flow of the paint so that it will not flow from the wall when sprayed on. It may be eliminated entirely or increased to 30%. It may be replaced in whole or in part by ordinary talc, pyrophyllite, clay, silica or other siliceous fillers.

"Metronite" is the trade name for a natural deposit which consists mainly of tremolite, talc and dolomite. It acts as a filler, a white pigment, and also decreases the consistency and increases the flow and brushing qualities. It may be omitted entirely or increased to 30%. It may be replaced in whole or in part by any of its constituent components or by calcium carbonate, barytes, silica or various silicates or other white fillers.

The mica due to its leafing action decreases the tendency to crack and increases resistance to water. It may be left out entirely or raised to 10%. It may be replaced in whole or in part by pyrophyllite or other minerals of similar flakelike structure.

The ingredients of my composition may be mixed in any desired order except that it is preferable to mix the calcium stearate with the Portland cement before mixing in the other ingredients. This dry mixture is mixed with water to produce a paint-like composition which may be sprayed or brushed onto a surface to be coated.

This paint is suitable only for application to clean porous surfaces such as stucco, cement, brick, tile, etc. Like cement or lime, it has rather low elasticity, but becomes an integral part of a material with a porous surface when the coefficient of expansion is nearly the same. It will not adhere to wood or metal or to greasy surfaces, or surfaces which have been painted with oil or casein paints, or paints with other organic binders.

Aside from the question of improving a paint composition such as specifically herein disclosed, the present invention can likewise be applied if the composition is to be moulded instead of being applied by means of a spray-gun or brush. Thus, by mixing the composition with less water, a pasty mass or slurry will result which can be employed for moulding or for being otherwise shaped or formed, and then allowed to set. The Portland cement is a setting, cementitious substance; and lime, as is well known, is the basic material for the making of mortar and certain types of plaster. The talc, "Metronite" and mica are fillers or finely divided aggregate. As the composition dries by both setting as well as mere evaporation of excess gaging-water, it is evident that any means which will lower the amount of excess water used will be equally advantageous either when using the composition as a paint or as a plastic material.

The fundamental improvement which flows from the practice of the present invention is, therefore, the lowering of the consistency of a cementitious mixture by incorporating therewith, or treating the same with, a gum such as gum arabic or its equivalent in which the acid groups have been saturated or neutralized by means of an alkaline-reacting substance such as lime. In the hereunto appended claims the terms "hydraulically setting material," "hydraulically setting substance" and "hydraulic cement" are used as descriptive of those classes of inorganic cementitious substances that set on admixture with water or aqueous solutions, as for example Portland cement, natural cement, Roman cement, Keene's cement and other calcined gypsum products, and their equivalents.

What is claimed is:

1. The process of lowering the consistency of a suspension of a hydraulically setting material in a liquid medium which comprises treating the suspension with a composition comprising gum arabic and calcium hydroxide, in amounts to render the composition alkaline.

2. The process of lowering the consistency of a composition containing a hydraulic cement which comprises adding thereto gum arabic and an alkaline reacting substance, in amounts to render the composition alkaline.

3. The process of lowering the consistency of a composition containing a hydraulic cement which comprises adding thereto gum arabic and an alkaline-earth hydroxide, in amounts to render the composition alkaline.

4. A composition of matter suitable for painting and the like which comprises a hydraulic cement, a pigment or filler, and sufficient gum arabic and alkaline-reacting substances in amounts to render the composition alkaline so as to lower the consistency of the mixture to below the consistency it would have when suspended in water with the gum arabic and alkaline-reacting substance omitted.

5. A dry composition capable on mixture with water of forming a paint comprising a mixture of hydraulic cement, a water-proofing agent, talc, salt, mica, gum arabic, gum karaya, Irish moss, and a natural filler composed largely of tremolite, talc and dolomite.

6. A dry composition capable on mixture with water of forming a cement having approximately the following compositions—

| | Per cent |
|---|---|
| Hydrated lime | 43.0 |
| Hydraulic cement | 19.5 |
| Talc | 12.0 |
| Tremolite | |
| Talc | 11.5 |
| Dolomite | |
| Salt | 6.5 |
| Mica | 5.0 |
| Gum arabic | 1.6 |
| Gum karaya | 0.5 |
| Irish moss | 0.1 |
| Calcium stearate | 0.3 |

7. The process of lowering the consistency of a mixture of a hydraulic cement and a gaging fluid which comprises treating the same with alkalinized gum arabic.

8. A mixture comprising a hydraulically setting substance, gum arabic and calcium hydroxide, the gum arabic and calcium hydroxide reacting with each other to produce an alkaline-reacting compound that lowers the consistency of the mixture when gaged with water.

9. A mixture comprising a hydraulic cement, gum arabic, and lime, the latter in amounts sufficient to render the mixture alkaline.

10. A mixture comprising a hydraulic cement, gum arabic, and an alkali, the latter in amounts sufficient to render the mixture alkaline.

HERMAN A. SCHOLZ.